(12) United States Patent
Zhang et al.

(10) Patent No.: US 11,239,981 B2
(45) Date of Patent: Feb. 1, 2022

(54) MULTIPLEXING OF CHANNEL STATE INFORMATION REFERENCE SIGNALS (CSI-RS)

(71) Applicant: Intel Corporation, Santa Clara, CA (US)

(72) Inventors: Yushu Zhang, Beijing (CN); Alexei Davydov, Nizhny Novgorod (RU); Gang Xiong, Portland, OR (US); Sameer Pawar, Santa Clara, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/603,908

(22) PCT Filed: Jun. 27, 2018

(86) PCT No.: PCT/US2018/039859
§ 371 (c)(1),
(2) Date: Oct. 9, 2019

(87) PCT Pub. No.: WO2019/006031
PCT Pub. Date: Jan. 3, 2019

(65) Prior Publication Data
US 2020/0119893 A1 Apr. 16, 2020

(30) Foreign Application Priority Data

Jun. 27, 2017 (WO) ................ PCT/CN2017/090258
Jun. 27, 2017 (WO) ................ PCT/CN2017/090345

(51) Int. Cl.
*H04W 56/00* (2009.01)
*H04L 5/00* (2006.01)
(Continued)

(52) U.S. Cl.
CPC ......... *H04L 5/0092* (2013.01); *H04B 7/0695* (2013.01); *H04L 1/0026* (2013.01); *H04L 5/0051* (2013.01); *H04L 5/0094* (2013.01); *H04L 25/0226* (2013.01); *H04W 56/001* (2013.01); *H04W 72/0446* (2013.01); *H04W 76/27* (2018.02); *H04W 80/08* (2013.01)

(58) Field of Classification Search
CPC ... H04L 5/0092; H04L 1/0026; H04L 5/0051; H04L 5/0094; H04L 25/0226;
(Continued)

(56) References Cited

U.S. PATENT DOCUMENTS

2013/0215811 A1* 8/2013 Takaoka ............ H04W 28/0268
370/311
2017/0302419 A1* 10/2017 Liu ........................ H04L 5/0082
(Continued)

OTHER PUBLICATIONS

Samsung; R1-1705345; 3GPP TSG RAN WG1 88bis; Refinement on CSI Acquisition Framework; Spokane, Washington USA; Apr. 3-7, 2017.
(Continued)

*Primary Examiner* — Sai Ming Chan
(74) *Attorney, Agent, or Firm* — Alliance IP, LLC

(57) ABSTRACT

Technology for a next generation node B (gNB) operable to transmit in multiple bandwidth parts (BWPs) is disclosed. The UE can determine a channel state information reference signal (CSI-RS) symbol location in a first bandwidth part (BWP). The UE can determine a CSI-RS symbol location in a second BWP. The UE can encode the CSI-RS in one or more of the first BWP or the second BWP for transmission to a user equipment (UE). The UE can have a memory interface configured to send to a memory the CSI-RS symbol location.

16 Claims, 14 Drawing Sheets

(51) Int. Cl.
*H04W 76/27* (2018.01)
*H04B 7/06* (2006.01)
*H04L 1/00* (2006.01)
*H04L 25/02* (2006.01)
*H04W 72/04* (2009.01)
*H04W 80/08* (2009.01)

(58) Field of Classification Search
CPC ............... H04W 76/27; H04W 56/001; H04W 72/0446; H04W 80/08; H04B 7/0695
USPC ........................................................ 370/329
See application file for complete search history.

(56) References Cited

U.S. PATENT DOCUMENTS

| | | | |
|---|---|---|---|
| 2018/0249339 A1* | 8/2018 | Noh | H04L 27/261 |
| 2018/0270699 A1* | 9/2018 | Babaei | H04W 72/1284 |
| 2018/0332541 A1* | 11/2018 | Liu | H04W 72/042 |
| 2019/0053235 A1* | 2/2019 | Novlan | H04L 5/001 |
| 2019/0059012 A1* | 2/2019 | Nam | H04W 24/08 |
| 2019/0132109 A1* | 5/2019 | Zhou | H04W 76/38 |
| 2019/0289552 A1* | 9/2019 | Jain | H04W 52/0261 |

OTHER PUBLICATIONS

LG Electronics; R1-1707608; 3GPP TSG RAN WG1 Mtg 89; Discussion on interference measurement and rate matching for NR; Hangzhou, CHINA; May 15-19, 2017.

ZTE; R1-1710194; 3GPP TSG RAN WG1 NR Ad-Hoc#2; On CSI-RS for beam management; Qingdao, CHINA; Jun. 27-30, 2017.

EPO; Office Action issued in EP Patent Application No. 18743649.8, dated Oct. 19, 2021; 10 pages.

Mediatek Inc., "Further Details on Wider Bandwidth Operations in NR," 3GPP Draft; R1-17010796 (Jun. 26, 2017) Qindao P.R. China, Jun. 27-30, 2017 (7 pages).

* cited by examiner

MULTIPLEXING OF CHANNEL STATE INFORMATION REFERENCE SIGNALS (CSI-RS)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
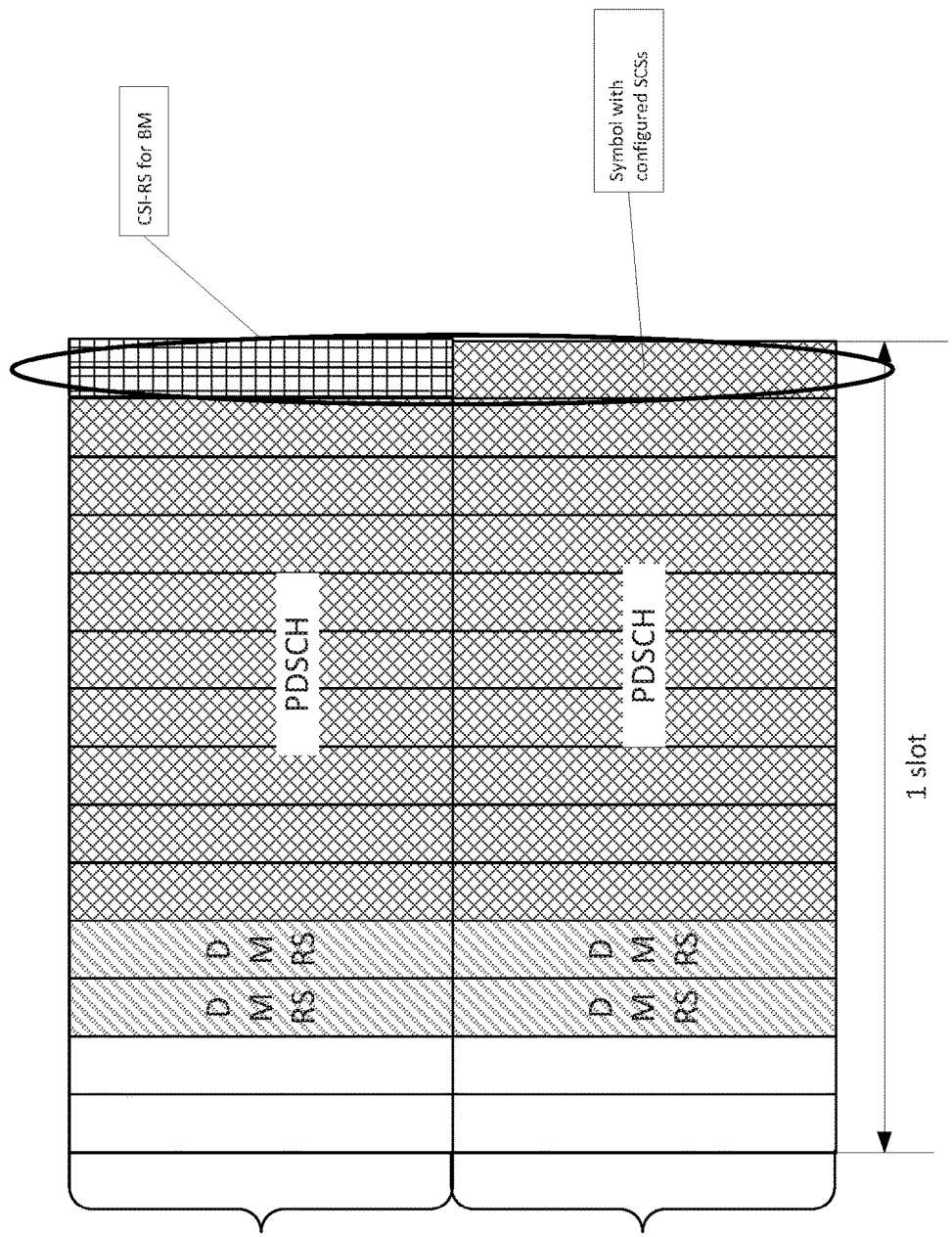
FIG. 1 illustrates an example of multiple bandwidth parts (BWPs), in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. Mechanisms are disclosed for configuration of downlink (DL) control channel monitoring occasions. Additionally, different options for defining UE behavior and handling of multiple DL control channel monitoring configurations from a single UE perspective are disclosed. The next generation wireless communication system, 5G or new radio (NR) will provide access to information and sharing of data anywhere, at any time by various users and applications. NR is expected to be a unified network/system that is targeted to meet vastly different and sometime conflicting performance dimensions and services.

Such diverse multi-dimensional designs are driven by different services and applications. In general, NR will evolve based on 3GPP LTE-Advanced with additional potential new Radio Access Technologies (RATs) to enrich people lives with better, simple and seamless wireless connectivity solutions. NR will enable everything to be connected by wireless and deliver fast, rich contents and services.

For the 5G system, to support wide system bandwidth, the user equipment (UE) may be configured with multiple bandwidth parts (BWP), where each bandwidth can be associated with a numerology. This indicates that different BWPs may be employed with different numerologies. However, depending on the UE capability, some UEs may not be able to transmit or receive a signal that transmits different subcarrier spacings (SCSs) simultaneously as they may not support frequency division multiplexing (FDM) based multiplexing of different numerologies in a given time instance.

FIG. 1 illustrates an example of multiple bandwidth parts (BWPs), and instances where the multiple BWPs are with the same subcarrier spacing (SCS), but the channel state information-reference signal (CSI-RS) for beam management (BM) utilizes a larger SCS.

Whether the multiple BWPs with different SCSs can be enabled simultaneously, could rely on the UE's capability. Some UEs may be able to use only one SCS for a given time instance. For these instances, and for those UEs, the uplink (UL)/downlink (DL) signal with different SCSs at the same time, should not be scheduled. For another set of UEs, the UEs may support two SCSs at one time. As such, up to two different SCSs can be used for UL and/or DL signals. Therefore, the UE capability related to the SCSs at one time can be reported.

In an embodiment, the number of different SCSs for a given time instance that the UE can support should be reported from the UE by higher layer signaling, or UE capability reporting. The UE can also report which SCSs it supports.

In the following section, the embodiment in which the UE cannot support simultaneous multiple SCSs based transmission or reception for a given time instance, will be discussed.

DL Signal Transmission for Multiple BWPs

Figure 2:
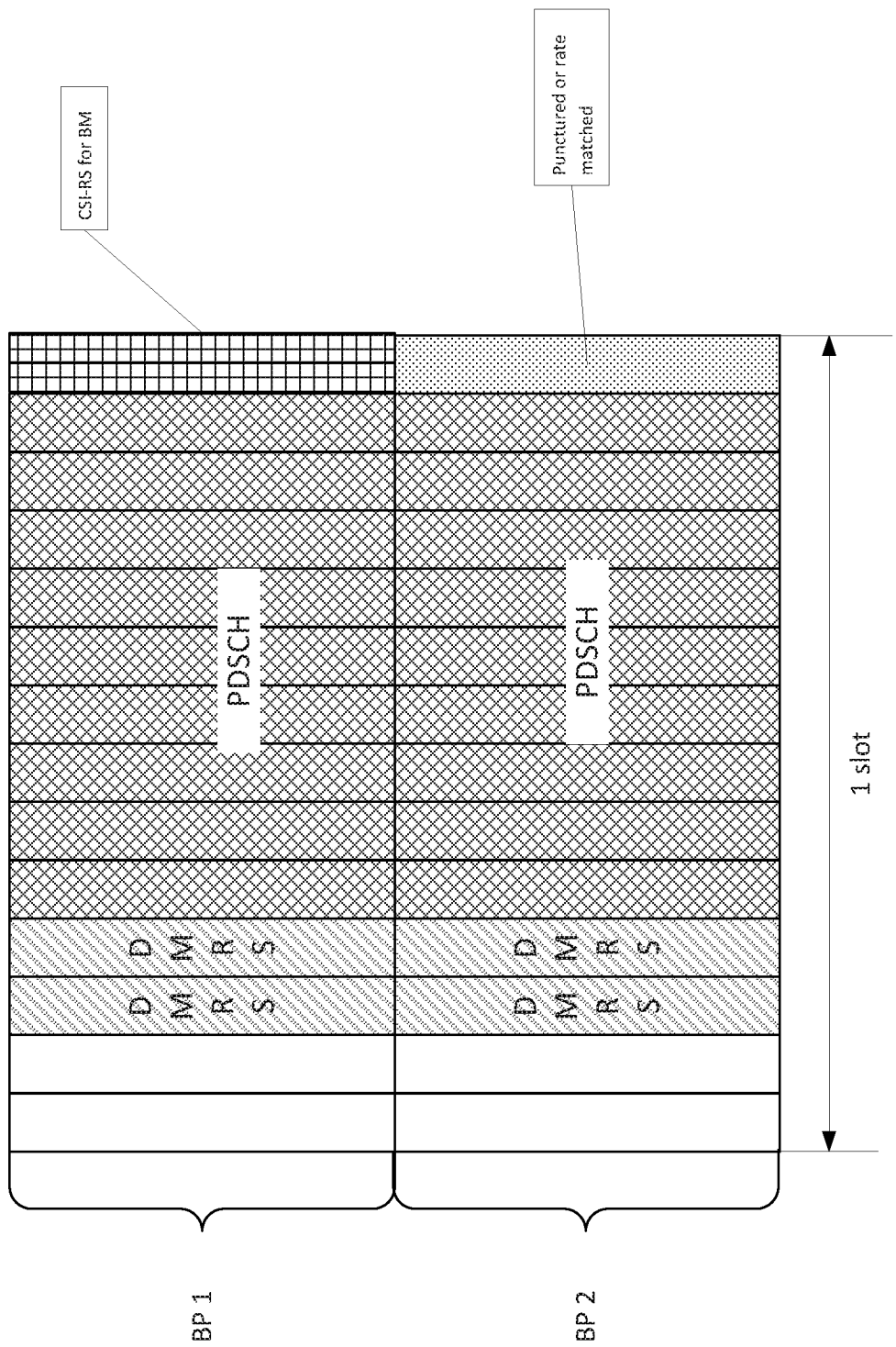
FIG. 2 illustrates an example option for the channel state information reference signal (CSI-RS) and data transmission for multiple bandwidth parts (BWPs), in accordance with an example.

FIG. 2 illustrates an example option for the channel state information reference signal (CSI-RS) and data transmission for multiple bandwidth parts (BWPs).

As shown in FIG. 2, the larger SCS may be used for CSI-RS. Then when multiple BWPs are simultaneously active, some next generation node B (gNB) and UE behaviors configured to handle the symbol(s) that have CSI-RS can be defined.

In an embodiment, for the symbol with larger SCS based CSI-RS, the subcarriers used for physical downlink shared channel (PDSCH) transmission in other BWPs can be punctured or rate matched. Whether the subcarriers are punctured or rate matched can be pre-defined or configured by higher layer signaling and/or Downlink Control Signaling (DCI). In another option, the UE may skip measurement of the CSI-RS.

Figure 3:
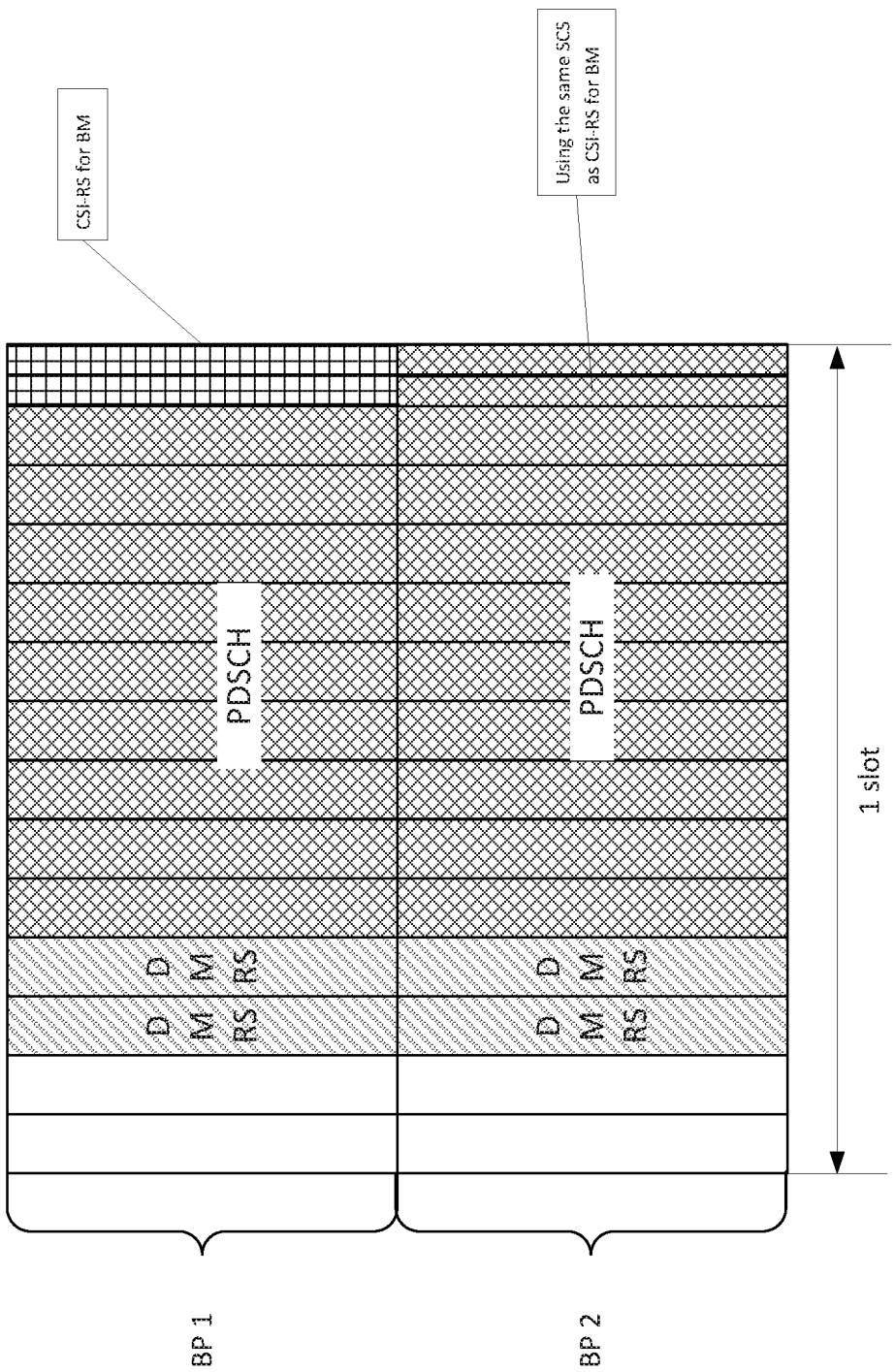
FIG. 3 illustrates another example option for the channel state information reference signal (CSI-RS) and data transmission for multiple bandwidth parts (BWPs), in accordance with an example.

FIG. 3 illustrates another example option for the channel state information reference signal (CSI-RS) and data transmission for multiple bandwidth parts (BWPs). In one embodiment, the data channel can use the same SCS as the CSI-RS in the symbol(s) where the CSI-RS for BM is transmitted. The subcarriers in those symbols can also be used for PDSCH. The Phase Tracking Reference Signal (PT-RS) can also be transmitted in that symbol. FIG. 3 illustrates one example for this option.

Figure 4:
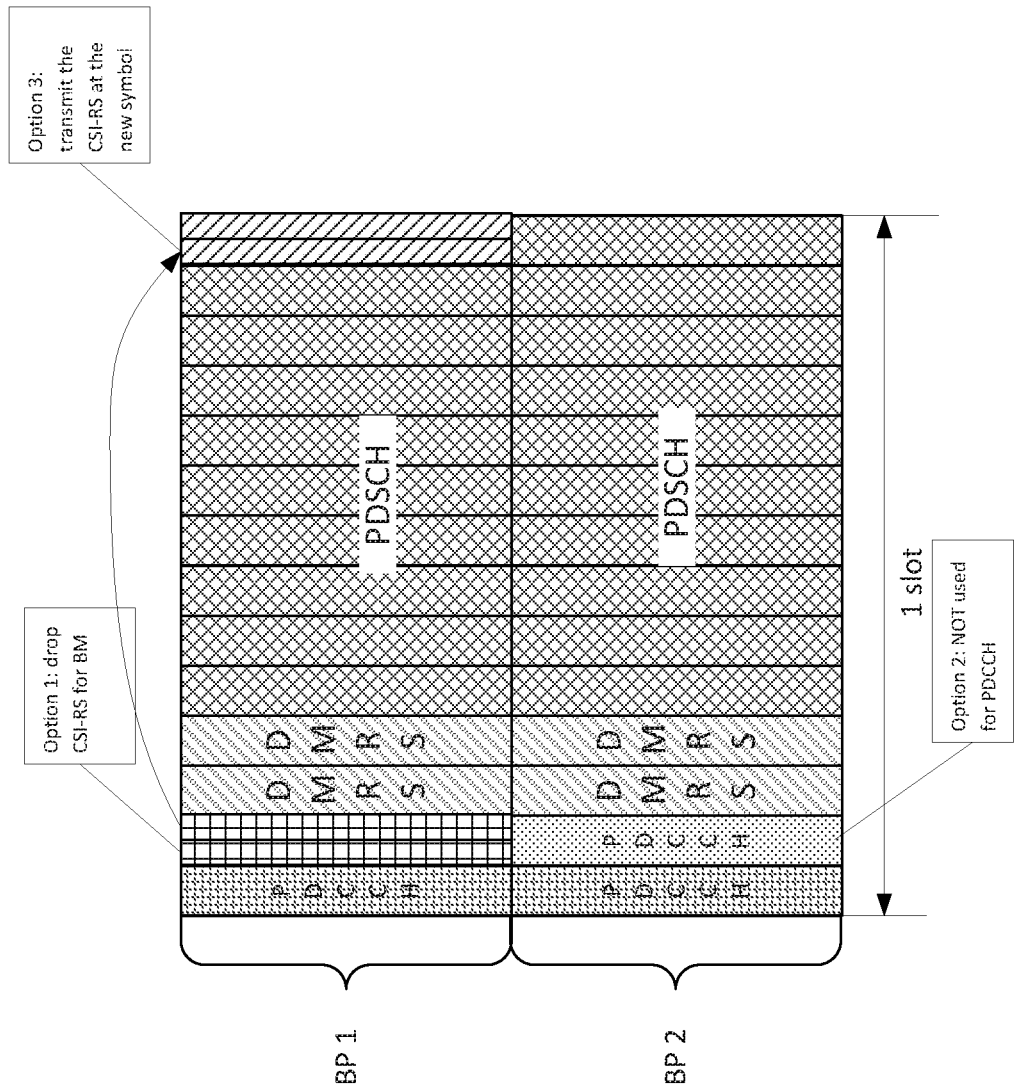
FIG. 4 illustrates example for CSI-RS and physical downlink control channel (PDCCH) transmission for multiple BWPs, in accordance with an example.

FIG. 4 illustrates an example for CSI-RS and physical downlink control channel (PDCCH) transmission for multiple BWPs. In one embodiment, the symbol with CSI-RS may be in the symbol before DMRS, which may be used for PDCCH in another BWP. Additionally, the following options can be implemented, which are also illustrated in FIG. 4. In option 1, the CSI-RS can be dropped or the UE may skip the measurement of the CSI-RS. In option 2, the symbol intended for PDCCH transmission is not used for PDCCH. In option 3, new symbol(s) can be allocated for the CSI-RS, e.g. at the last symbol of the PDSCH, or other symbols in the current slot or another slot.

In another embodiment, the symbol(s) may be used for CSI-RS in both of the BWPs, but the SCS for the CSI-RS that is in a different BWP(s) are different. In one option, time hopping, can be used for one CSI-RS. In another option the UE may skip the measurement of CSI-RS in one of the BWPs. Additionally, there can be the following options to define the dropping rules. In the first option, periodic CSI-RS can be dropped, where dropping the CSI-RS is based on its transmission behavior, which can be either periodic or aperiodic. In the second option, there can be a drop rule where the CSI-RS is dropped according to the BWP index. In the third option, the CSI-RS can be dropped according to the SCS. In the fourth option, the CSI-RS can be dropped according to its periodicity if both CSI-RS are transmitted periodically.

In another embodiment, the Synchronization Signal Block (SS-Block) may use a different SCS. Then, in the case where the symbols include the SS-block in one BWP, for another BWP if the symbol(s) are used for PDSCH transmission for one UE, the UE may skip the measurement of the SS-block, or the subcarriers in those symbols may be punctured or rate matched. Additionally, if the symbol(s) are used for the physical downlink control channel (PDCCH), the UE may skip the measurement of the SS-Block or assume that no DCI is transmitted in this slot. In another option, when the symbols used for the transmission of PDCCH and/or PDSCH collide with the SS block(s), the SCS in the symbols used for the transmission of PDCCH and/or PDSCH may follow the SCS used in the SS block(s). In another option, if the symbol(s) are used for CSI-RS, the time domain hopping may be used for the CSI-RS, or the UE may skip the measurement of either CSI-RS or SS-block which can be pre-defined or configured by higher layer signaling and/or DCI or determined by the transmission scheme of CSI-RS, which can be periodic or aperiodic.

Note that the above mechanisms can apply when there is one or more of a PDCCH, a PDSCH, an SS block, a CSI-RS, a demodulation reference signal (DM-RS) and/or a phase tracking reference signal (PT-RS). This is applicable where there is any other DL channel or signal using a first numerology in a first bandwidth part (BWP) that collides with the PDCCH and/or PDSCH, and/or SS block, and/or CSI-RS and/or DM-RS and/or PT-RS and/or any other DL channel or signal using a second numerology in a second BWP. In this case, some dropping rules may be defined in accordance with the ordering of a numerology index, a BWP index, or dropping rules that are configured by higher layers via minimum scheduling information (MSI), remaining MSI (RMSI), system information block (SIB) or radio resource control (RRC) signaling.

UL Transmission for Multiple BWPs

There can be similar collision cases in UL to that in DL. These collisions may happen among the signals including SRS, PUSCH and PUCCH. In one embodiment, when different numerologies are applied for the transmission of multiple SRSs for a given time instance, the UE may only transmit one SRS while dropping others. The dropping rule or priority rule may be defined in accordance with the ordering of the numerology index, the BWP index, or may be configured by higher layers via new radio (NR) minimum system information (MSI), NR remaining minimum system information (RMSI), NR system information block (SIB) or radio resource control (RRC) signaling.

Figure 5:
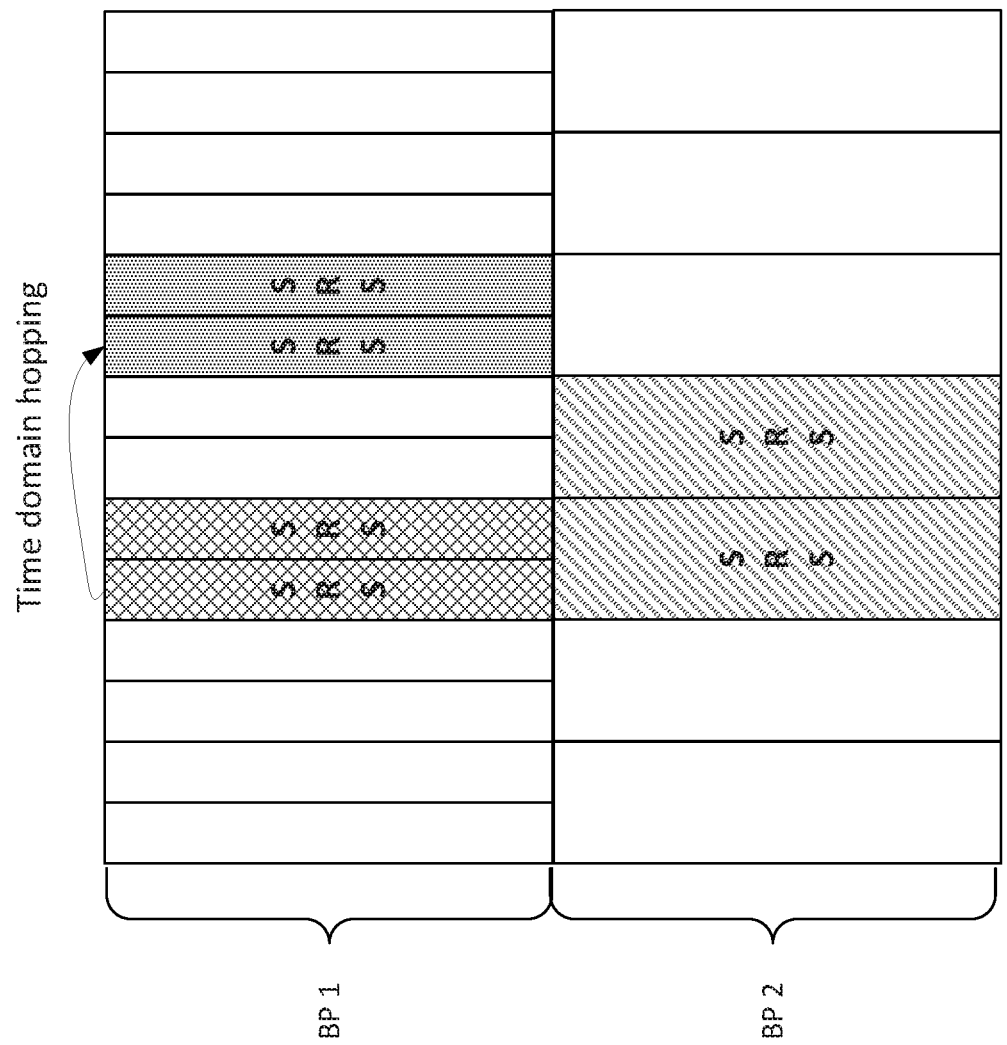
FIG. 5 illustrates an example for time domain hopping of a sounding reference signal (SRS), in accordance with an example.

FIG. 5 illustrates one example for the SRS time domain hopping when multiple SRSs with different SCS collide in the time domain. In an embodiment, when collisions happen for the symbols with one or more SRS in different BWPs, the time domain hopping can be used for the SRS in a first BWP. In this case, the SRS in the first BWP can be transmitted in another symbol or multiple symbols. The symbol offset can be pre-defined or configured by higher layer signaling or DCI or a combination thereof.

Figure 6:
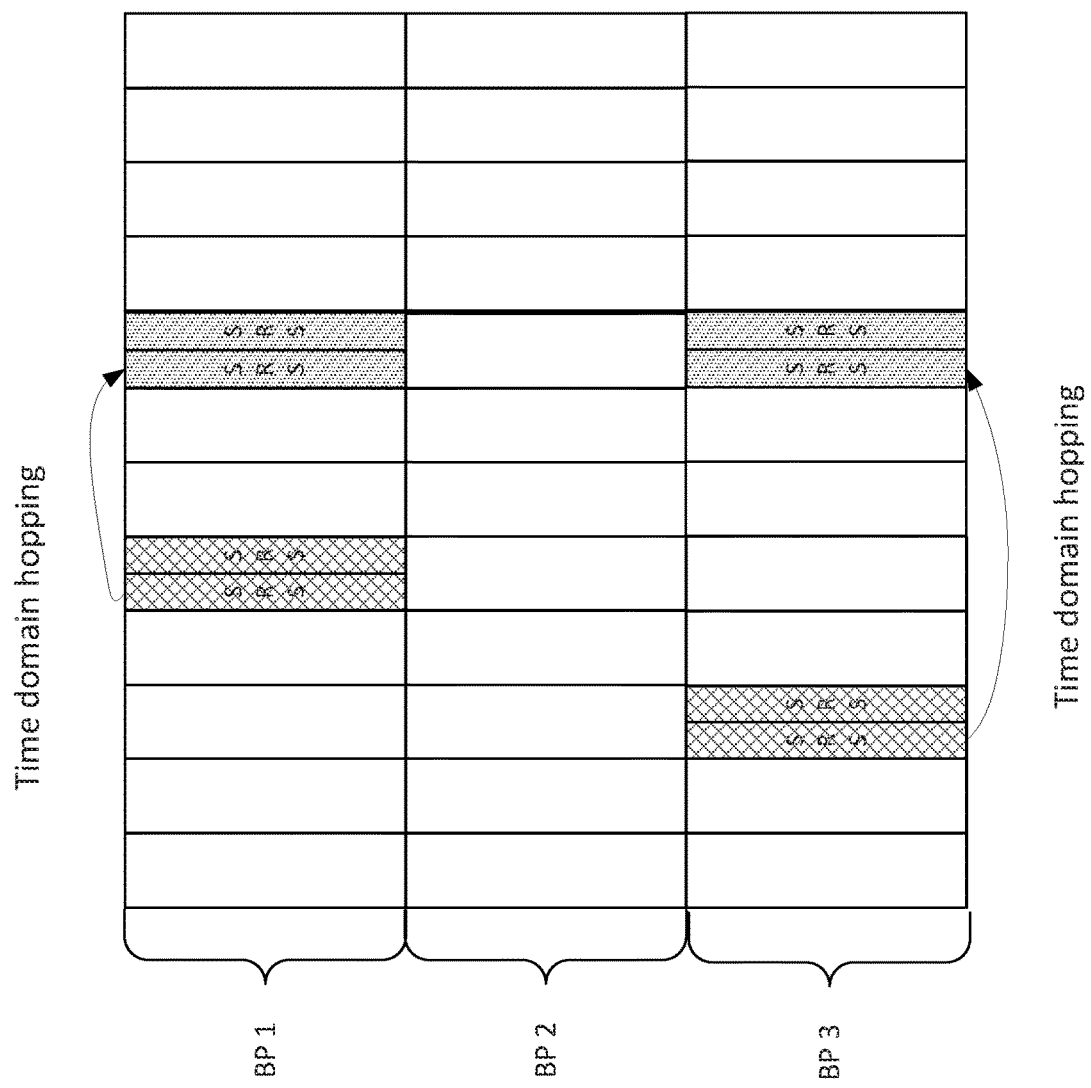
FIG. 6 illustrates an example or time domain hopping across multiple BWPs, in accordance with an example.

FIG. 6 illustrates an example or time domain hopping across multiple BWPs. if the two BWPs are using the same SCS, but the SRS can use a larger SCS, which is similar to the case in the CSI-RS shown in FIG. 1, the time domain hopping can also be used. If there are 2 or more BWPs sharing the same SCS, but some of the BWPs include the SRS with the larger SCS configuration, the time domain hopping of the SRS can be configured for multiple BWPs to keep the SRS with the larger SCS transmitting in the same symbol(s).

In another embodiment, when a collision happens for the symbols with a physical uplink control channel (PUCCH) in multiple BWPs, the UE may send only one PUCCH while dropping all other PUCCHs. The dropping rule or priority rule may be determined in accordance with the ordering of the numerology index, the BWP index or the content of the PUCCH in different BWPs, or may be configured by higher layers via MSI, RMSI, SIB or RRC signaling. In one example, if the PUCCH in a first BWP is used to carry hybrid automatic repeat request acknowledgement (HARQ-ACK) feedback, the PUCCH in a second BWP carrying other uplink control information (UCI) types including the CSI or beam report may be dropped.

In another example, if the PUCCH is used for CSI/beam reporting, the PUCCH can be dropped and the CSI/beam report can be carried by the PUSCH if scheduled.

Note that the above mechanisms can apply for the case when SRS and/or PUCCH, and/or PUSCH, and/or PRACH using a first numerology in a first BWP collides with the SRS and/or the PUCCH, and/or the PUSCH, and/or the physical random access channel (PRACH) using a second numerology in a second BWP. In this case, some dropping rules may be defined in accordance with the ordering of the numerology index, the BWP index, or the dropping rules may be configured by higher layers via the MSI, the RMSI, the SIB or RRC signaling.

Figure 7:
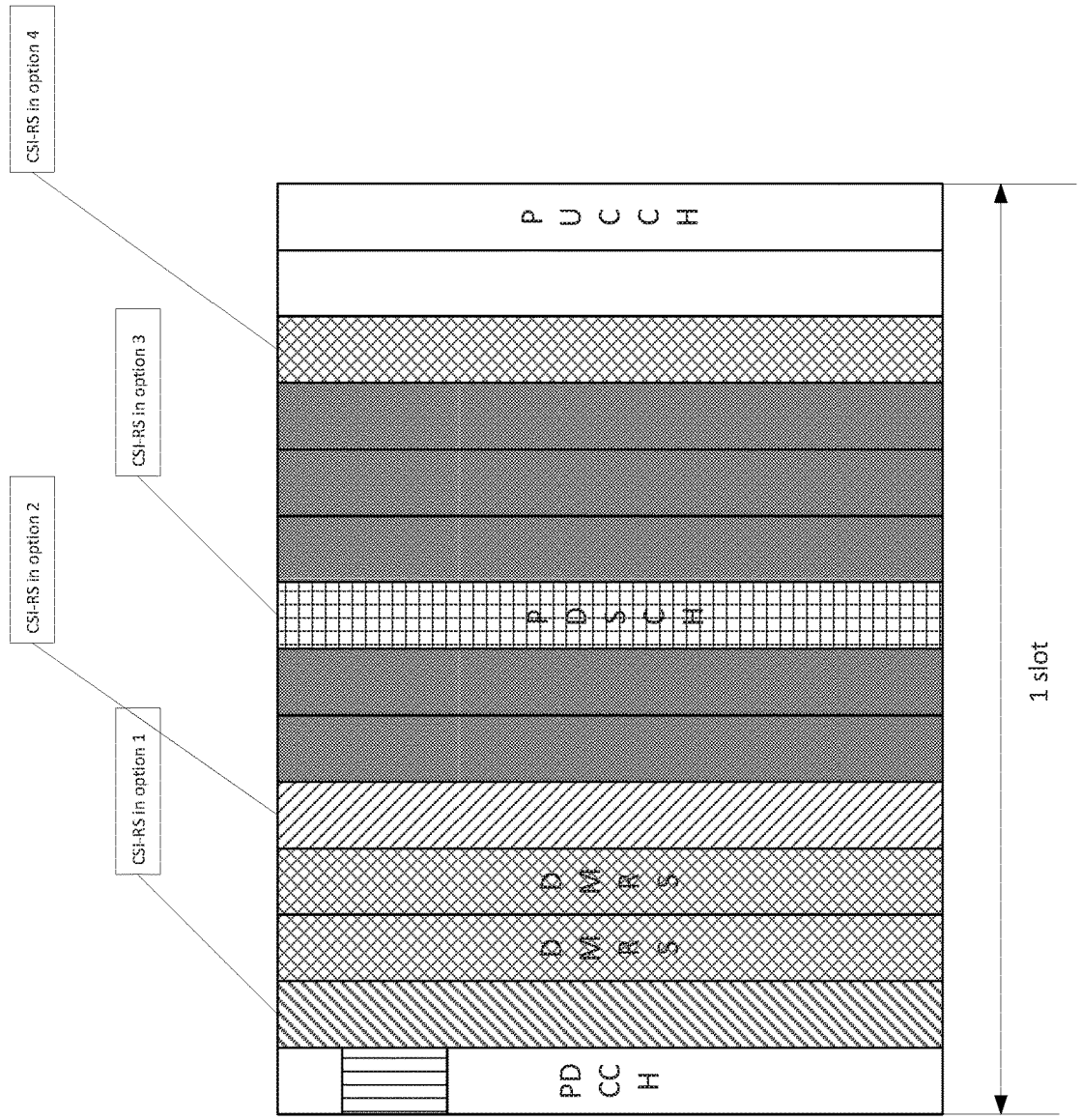
FIG. 7 illustrates an example for options for CSI-RS transmission, in accordance with an example.

FIG. 7 illustrates an example for options for CSI-RS transmission. There can be BM-CSI-RS and link adaptation CSI-RS (LA-CSI-RS) in the system for different purposes. In one option, the BM-CSI-RS and the LA-CSI-RS can be transmitted in different symbols. However in that way, in one slot, both the BM-CSI-RS and the LA-CSI-RS may exist. The gNB has to indicate the on/off status for each type of CSI-RS. In addition, there may be a potential collision between the BM-CSI-RS and the LA-CSI-RS if they are enabled separately. Hence, it is an option to jointly configure the BM-CSI-RS and the LA-CSI-RS.

In an embodiment, the BM-CSI-RS and LA-CSI-RS can be transmitted in the same symbol. There can be the following options to transmit the CSI-RS. In option 1, the CSI-RS is multiplexed to the symbol(s) before DMRS. In option 2, the CSI-RS is multiplexed to the symbol(s) after DMRS. In option 3, the CSI-RS is multiplexed to the symbol(s) in middle of the PDSCH. In option 4, the CSI-RS is multiplexed to the last symbol(s) of PDSCH.

More than one option can be defined and the selection of the option(s) can be configured by higher layer signaling or Downlink Control Information (DCI). Alternatively, the selection of the option(s) can be determined by a number of symbols for the CSI-RS and/or a number of symbols for the PDCCH and/or a number of symbols for DMRS and/or a number of symbols for the PDSCH. For example, if the PDCCH takes one symbol and the CSI-RS takes one symbol, option 1 may be used. In another example, if the CSI-RS takes two symbols, option 2 or 3 or 4 may be used.

In another embodiment, for the users with data transmission, the on/off and/or the number of symbols used for CSI-RS can be indicated by DCI. Table 1 illustrates one example for the indication of CSI-RS transmission.

TABLE 1 an example for indication of CSI-RS transmission for 2-bit indicator

| Indicator of CSI-RS transmission | indication |
| --- | --- |
| 00 | No CSI-RS |
| 01 | 1 symbol CSI-RS |
| 10 | 2 symbol CSI-RS |
| 11 | reserved |

In another embodiment, the CSI-RS can be transmitted periodically. This can cause a collision between the LA-CSI-RS and the BM-CSI-RS to happen. In this case, dropping one type of the CSI-RS should be necessary. In one option, either the LA-CSI-RS or the BM-CSI-RS should be dropped, which should be pre-defined or configured by higher layer signaling. In another option, the dropping rule is based on the periodicity of the LA-CSI-RS and the BM-CSI-RS. In one example, the one with the smallest periodicity should be dropped. If the periodicities for both the CSI-RS are equal, the dropping rule can be pre-defined or configured by higher layer signaling. Alternatively, the LA-CSI-RS and the BM-CSI-RS could be frequency division multiplexed (FDMed) within one symbol if there is a collision.

In another embodiment, for the control signaling of the CSI-RS, it could indicate which type of indication the CSI-RS belongs to. In one example, a 1-bit indicator can be used whether the CSI-RS is LA-CSI-RS or BM-CSI-RS. In another option, the type of CSI-RS can be implicitly indicated by the subcarrier spacing of CSI-RS. If the subcarrier spacing of CSI-RS is equal to the subcarrier spacing of the data channel, the LA-CSI-RS is used; otherwise, the BM-CSI-RS is used.

Figure 8:
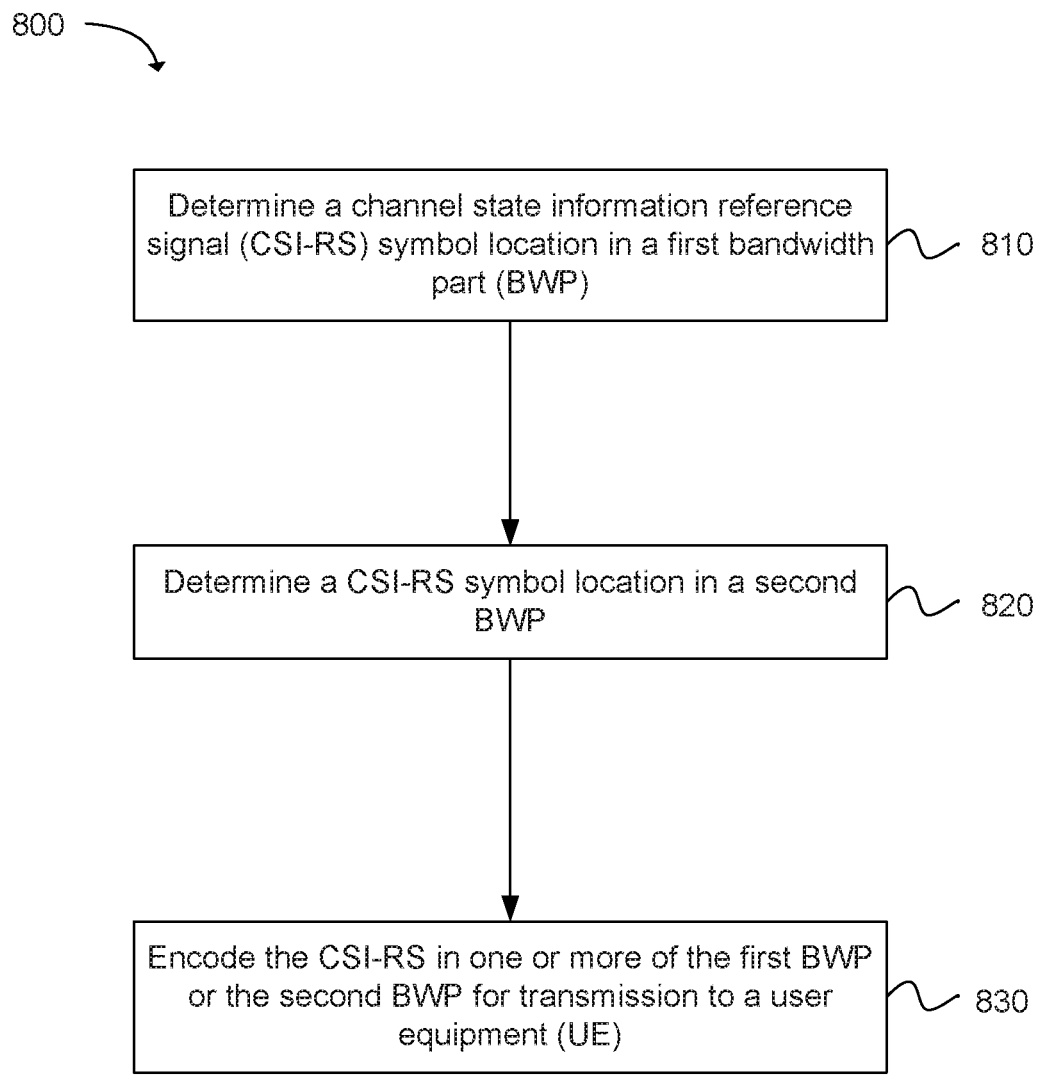
FIG. 8 depicts functionality of a user equipment (UE), operable for monitoring a physical downlink control channel (PDCCH), in accordance with an example.

FIG. 8 depicts functionality 800 of a next generation node B (gNB) operable to transmit in multiple bandwidth parts (BWPs). The UE can determine a channel state information reference signal (CSI-RS) symbol location in a first bandwidth part (BWP) 810. The UE can determine a CSI-RS symbol location in a second BWP 820. The UE can encode the CSI-RS in one or more of the first BWP or the second BWP for transmission to a user equipment (UE) 830.

In one embodiment, the one or more processors are further configured to decode a user equipment (UE) capability message indicating a UE's ability to use multiple BWPs to receive the CSI-RS; and encode the CSI-RS in the determined CSI-RS symbol location for the one or more of the first BWP or the second BWP based on the UE capability message.

In one embodiment, the one or more processors are further configured to decode the UE capability message to determine that the UE can support the first BWP with a first subcarrier spacing (SCS); and the second BWP with a second SCS; or the first BWP and the second BWP with the first SCS.

In one embodiment, the one or more processors are further configured to decode the UE capability message to determine a number of SCSs that the UE can support at a given time.

In one embodiment, the one or more processors are further configured to receive the UE capability message via a higher layer signal.

In one embodiment, the one or more processors are further configured to determine an SCS for each BWP in a plurality of BWPs; encode a CSI-RS for beam management (BM) for transmission in a BWP in the plurality of BWPs with a largest SCS at one or more last symbols in the BWP; and puncture corresponding symbols in a physical downlink shared channel (PDSCH) of remaining BWPs in the plurality of BWPs; or rate match corresponding symbols in the PDSCH of remaining BWPs in the plurality of BWPs.

In one embodiment, the one or more processors are further configured to encode a CSI-RS for beam management (BM) for transmission in a BWP in the plurality of BWPs at one or more last symbols in the BWP; and encode corresponding symbols in a physical downlink shared channel (PDSCH) of remaining BWPs in the plurality of BWPs with data.

In one embodiment, the one or more symbols in the BWP are a last symbol of the PDSCH.

In one embodiment, the one or more processors are further configured to determine the CSI-RS symbol location in the first BWP is located prior to a demodulation reference symbol (DM-RS); encode the CSI-RS in the first BWP at the determined CSI-RS symbol location; and encode a physical downlink control channel (PDCCH) at a symbol location in the second BWP that corresponds to the determined CSI-RS symbol location.

In one embodiment, the one or more processors are further configured to puncture the CSI-RS; or puncture the symbol location in the second BWP; or allocate one or more symbols at an end of a physical downlink shared channel (PDSCH) for transmission of the CSI-RS.

In one embodiment, the one or more processors are further configured to encode the CSI-RS for transmission in the first BWP with a first subcarrier spacing (SCS); and encode the CSI-RS for transmission in the second BWP with a second SCS; and drop the CSI-RS in one of the first BWP or the second BWP based on: a periodic transmission behavior of the first BWP and the second BWP; an aperiodic transmission behavior of the first BWP and the second BWP; a BWP index of the first BWP and the second BWP; a SCS of the first BWP and the second BWP; or a periodicity of the first BWP and the second BWP in a periodic transmission of the CSI-RS in the first BWP and the second BWP.

In one embodiment, the one or more processors are further configured to encode a synchronization signal block (SSB) and one or more additional downlink (DL) signals in a same symbol, wherein the one or more additional DL signals comprise the CSI-RS, a physical downlink shared channel (PDSCH, or a physical downlink control channel (PDCCH); and configure the UE to skip a measurement of the SSB when the additional DL signal is the PDSCH; or configure the UE to skip the measurement of the SSB when the additional DL signal is the PDCCH; or configure the UE to skip the measurement of the SSB or the CSI-RS when the additional DL signal is the CSI-RS.

Figure 9:
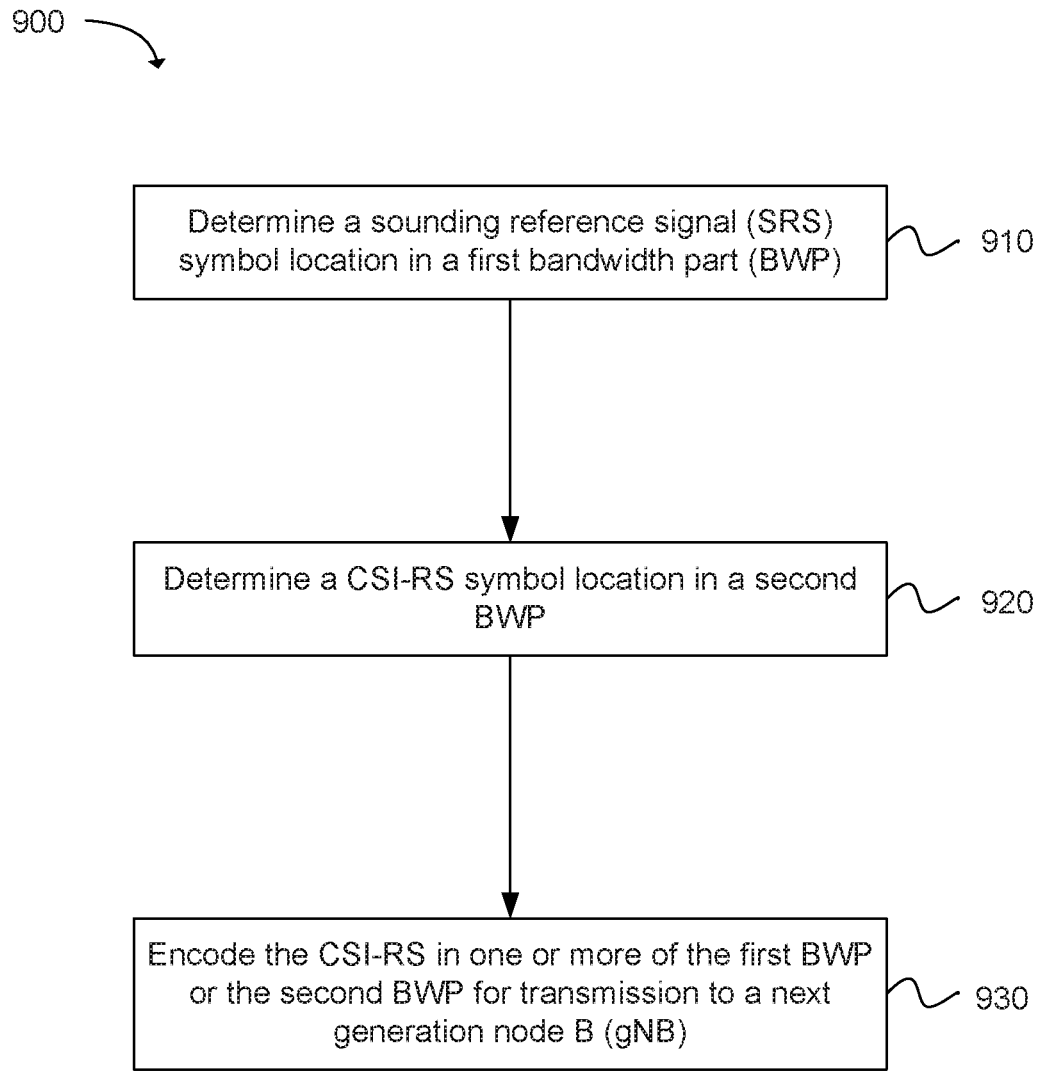
FIG. 9 depicts functionality of a user equipment (UE), operable for monitoring a physical downlink control channel (PDCCH), in accordance with an example.

FIG. 9 depicts functionality 900 of a user equipment (UE), operable to transmit in multiple bandwidth parts (BWPs). The UE can determine a sounding reference signal (SRS) symbol location in a first bandwidth part (BWP) 910. The UE can determine a SRS symbol location in a second BWP 920. The UE can encode the SRS in one or more of the first BWP or the second BWP for transmission to a next generation node B (gNB) 930.

In one embodiment, the one or more processors are further configured to transmit a physical uplink control channel (PUCCH), the SRS, or a physical random access channel (PRACH) in multiple BWPs in a same symbol based on: a dropping rule based on a BWP index; or a dropping rule based on a type of each channel; or a dropping rule based on a content of each channel.

In one embodiment, the one or more processors are further configured to drop the SRS in one of the first BWP or the second BWP based on: a numerology index of the first BWP and the second BWP; a BWP index of the first BWP and the second BWP; a higher layer signal via new radio (NR) minimum system information (MSI); a higher layer signal via NR remaining minimum system information (RMSI); a higher layer signal via NR system information block (SIB); or a higher layer signal via radio resource control (RRC) signaling.

In one embodiment, the one or more processors are further configured to: determine a collision of a first SRS symbol in a first BWP with a second SRS in a second BWP; or time domain hop the first SRS symbol in the first BWP.

Figure 10:
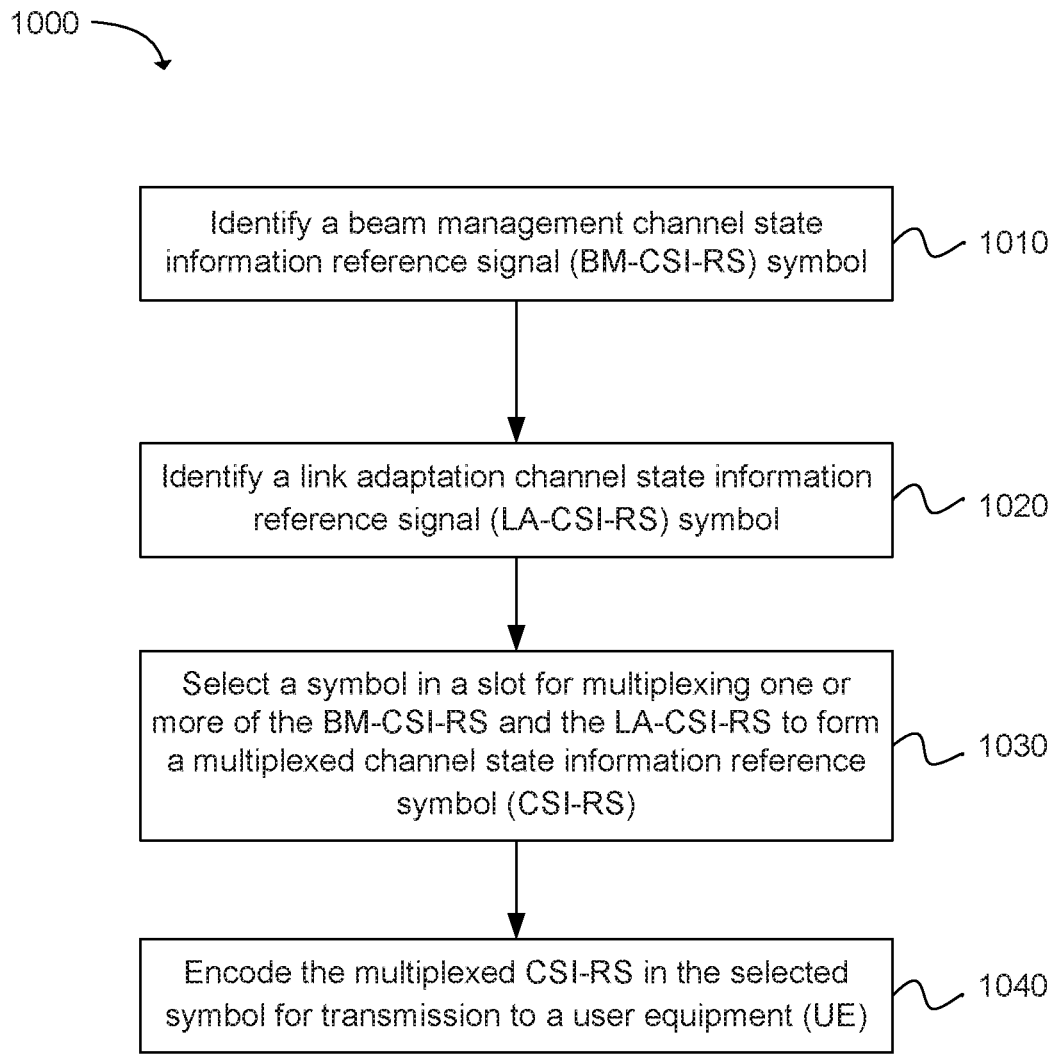
FIG. 10 depicts functionality of a next generation node B (gNB), operable to communicate on a physical downlink control channel (PDCCH), in accordance with an example.

FIG. 10 depicts functionality 1000 of a next generation node B (gNB), operable to multiplex reference signals. The gNB can identify a beam management channel state information reference signal (BM-CSI-RS) symbol 1010. The gNB can identify a link adaptation channel state information reference signal (LA-CSI-RS) symbol 1020. The gNB can select a symbol in a slot for multiplexing one or more of the BM-CSI-RS and the LA-CSI-RS to form a multiplexed channel state information reference symbol (CSI-RS) 1030. The gNB can encode the multiplexed CSI-RS in the selected symbol for transmission to a user equipment (UE) 1040.

In one embodiment, the one or more processors are further configured to select the symbol in the slot for multiplexing the BM-CSI-RS and the LA-CSI-RS, wherein a symbol location is: before a demodulation reference symbol (DMRS) in the slot; after a DMRS in the slot; in a middle of a physical downlink shared channel (PDSCH) in the slot; or in one or more symbols at an end of the PDSCH in the slot.

In one embodiment, the one or more processors are further configured to drop one of the BM-CSI-RS or the LA-CSI-RS based on: a higher layer signal of the BM-CSI-RS or the LA-CSI-RS; a periodicity of the BM-CSI-RS or the LA-CSI-RS; or a predefined configuration.

In one embodiment, the one or more processors are further configured to determine a priority of the BM-CSI-RS or the LA-CSI-RS based on: a one bit message indicating the gNB's ability to use the BM-CSI-RS or the LA-CSI-RS; or a subcarrier spacing (SCS) of the CSI-RS, wherein the LA-CSI-RS is used if the SCS of the CSI-RS is equal to a SCS of a data channel.

In one embodiment, the one or more processors are further configured to determine that the multiplexed CSI-RS has a CSI-RS type that is one of the BM-CSI-RS or the LA-CSI-RS; and encode the CSI-RS type as a higher layer parameter in a radio resource control (RRC) signal for transmission to the UE, to determine the CSI-RS type. If the parameter is configured, the CSI-RS is BM-CSI-RS; otherwise it is LA-CSI-RS.

Figure 11:
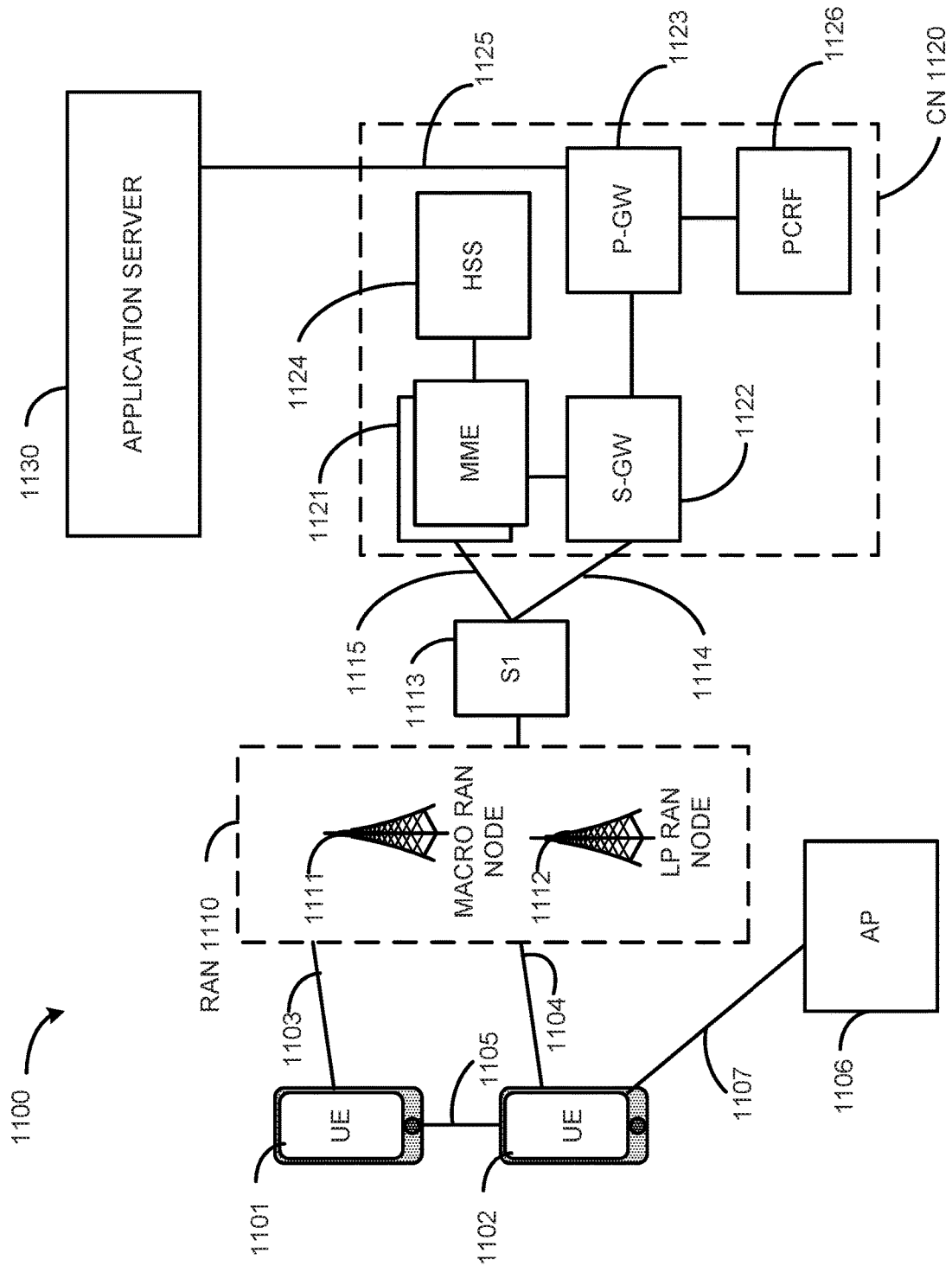
FIG. 11 illustrates an architecture of a network in accordance with an example.

FIG. 11 illustrates architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a Ne8Gen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a Next Gen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
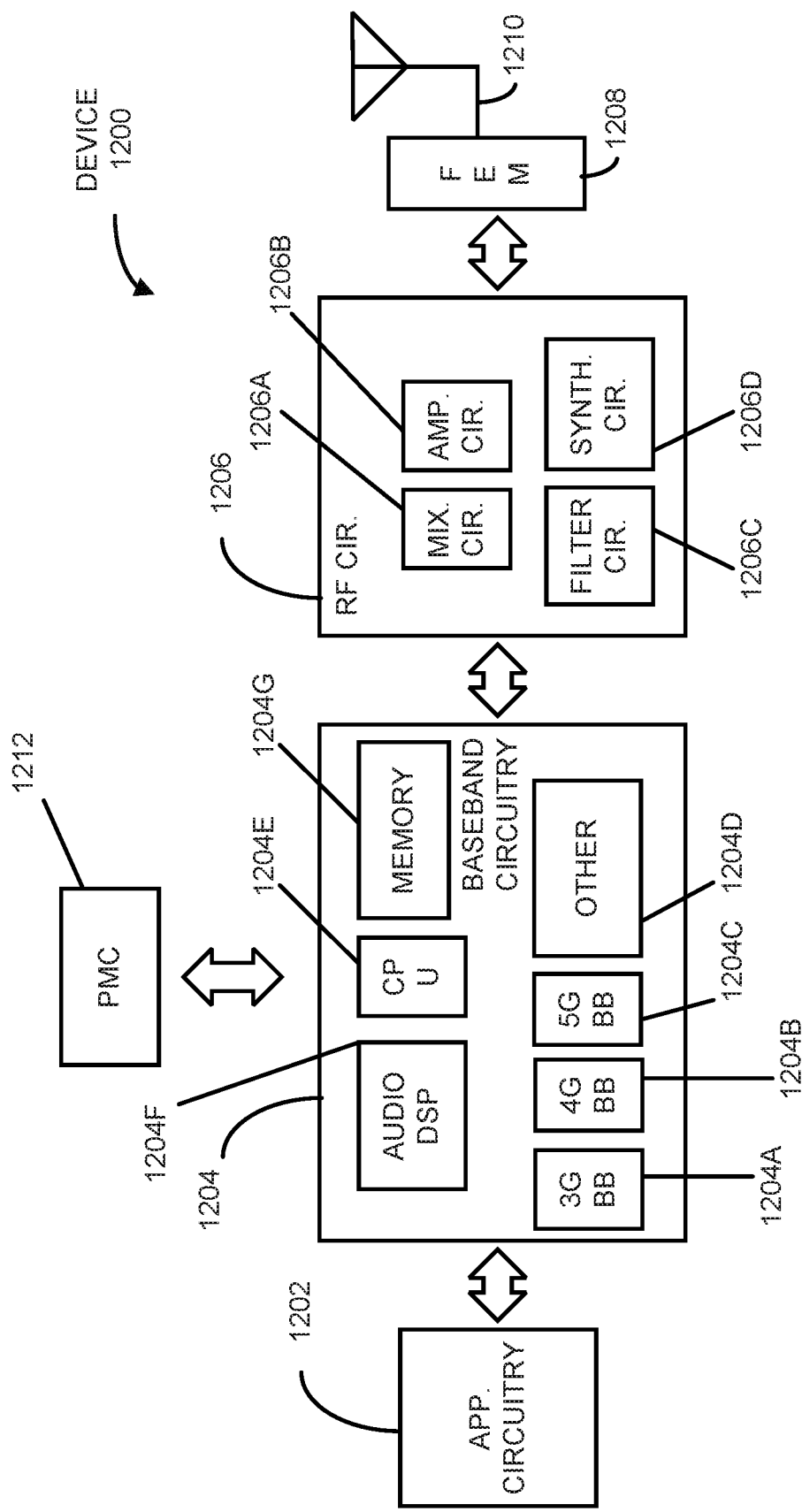
FIG. 12 illustrates a diagram of a wireless device (e.g., UE) and a base station (e.g., eNodeB) in accordance with an example.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry

1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a necessity. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1602, RF circuitry 1206, or FEM 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
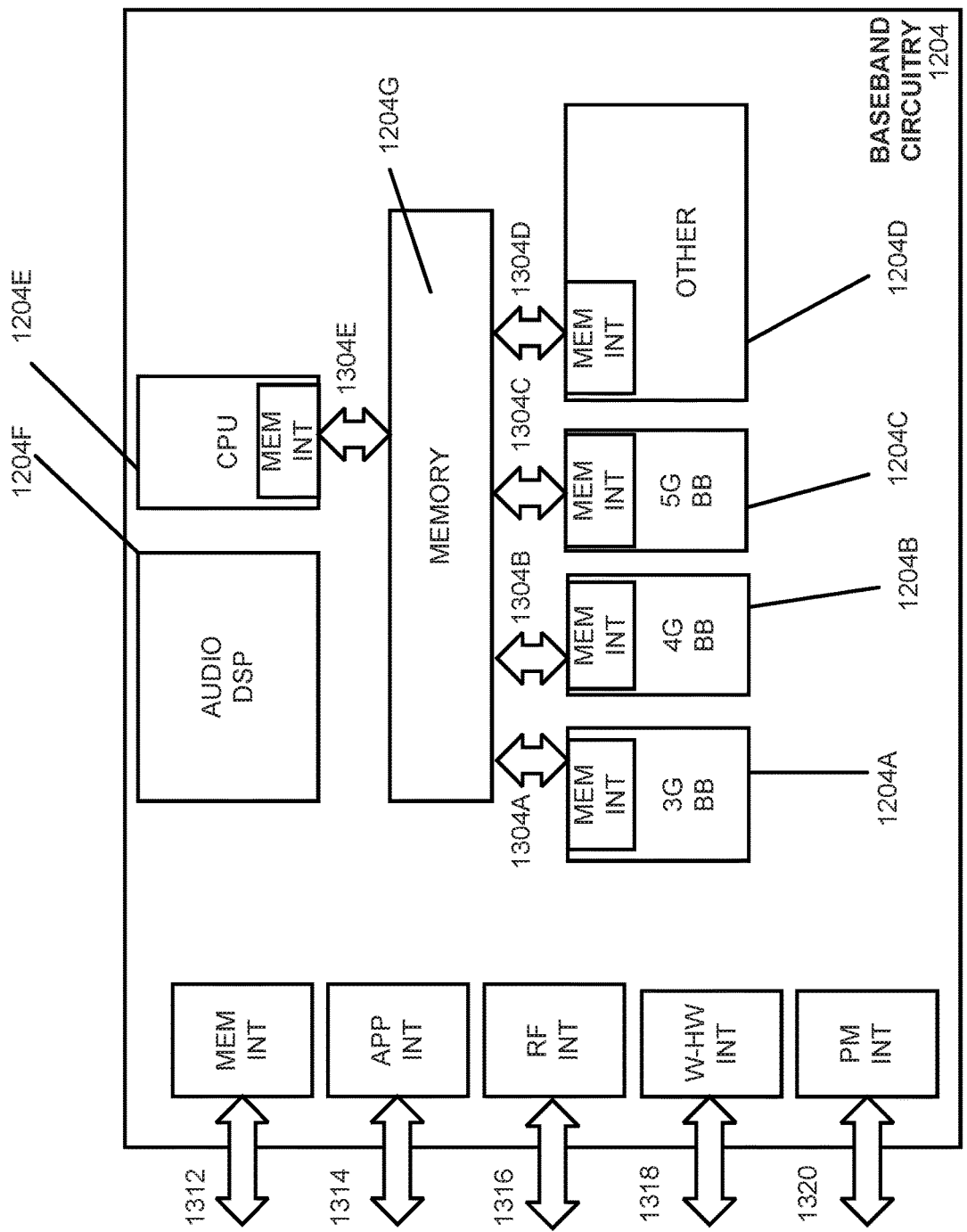
FIG. 13 illustrates example interfaces of baseband circuitry in accordance with an example.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
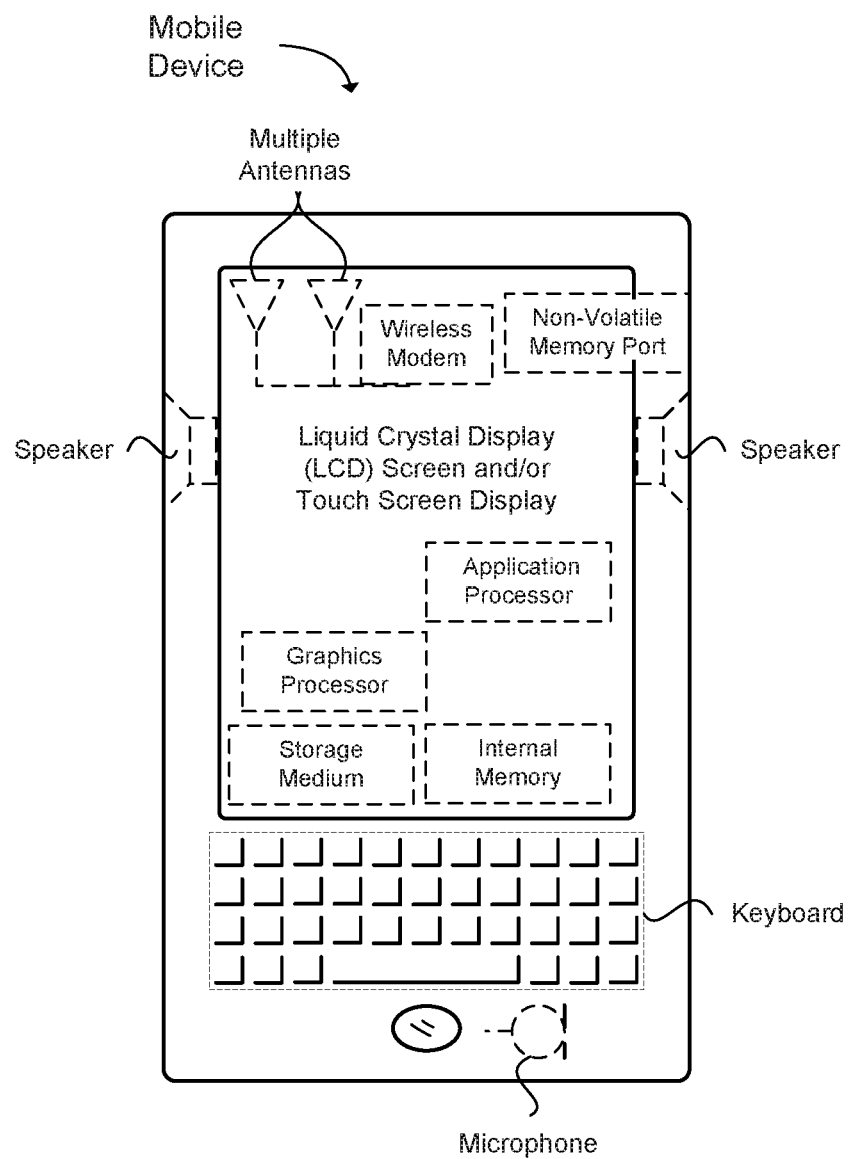
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a next generation node B (gNB) operable to transmit in multiple bandwidth parts (BWPs), the apparatus comprising: one or more processors configured to: determine a channel state information reference signal (CSI-RS) symbol location in a first bandwidth part (BWP); determine a CSI-RS symbol location in a second BWP; encode the CSI-RS in one or more of the first BWP or the second BWP for transmission to a user equipment (UE); and a memory interface configured to send to a memory the CSI-RS symbol location.

Example 2 includes the apparatus of the gNB of example 1, wherein the one or more processors are further configured to: decode a user equipment (UE) capability message indicating a UE's ability to use multiple BWPs to receive the CSI-RS; and encode the CSI-RS in the determined CSI-RS symbol location for the one or more of the first BWP or the second BWP based on the UE capability message.

Example 3 includes the apparatus of the gNB of example 1, wherein the one or more processors are further configured to decode the UE capability message to determine that the UE can support: the first BWP with a first subcarrier spacing (SCS); and the second BWP with a second SCS; or the first BWP and the second BWP with the first SCS.

Example 4 includes the apparatus of the gNB of example 1, wherein the one or more processors are further configured to decode the UE capability message to determine a number of SCSs that the UE can support at a given time.

Example 5 includes the apparatus of the gNB of example 1 to 4, wherein the one or more processors are further configured to receive the UE capability message via a higher layer signal.

Example 6 includes the apparatus of the gNB of example 1, wherein the one or more processors are further configured to: determine an SCS for each BWP in a plurality of BWPs; encode a CSI-RS for beam management (BM) for transmission in a BWP in the plurality of BWPs with a largest SCS at one or more symbols in the BWP; and puncture corresponding symbols in a physical downlink shared channel (PDSCH) of remaining BWPs in the plurality of BWPs; or rate match corresponding symbols in the PDSCH of remaining BWPs in the plurality of BWPs.

Example 7 includes the apparatus of the gNB of example 1, wherein the one or more processors are further configured to: encode a CSI-RS for beam management (BM) for transmission in a BWP in the plurality of BWPs at one or more symbols in the BWP; and encode corresponding symbols in a physical downlink shared channel (PDSCH) of remaining BWPs in the plurality of BWPs with data.

Example 8 includes the apparatus of the gNB of example 6 and 7, wherein the one or more symbols in the BWP are a last symbol of the PDSCH.

Example 9 includes the apparatus of the gNB of example 1, wherein the one or more processors are further configured to: determine the CSI-RS symbol location in the first BWP is located prior to a demodulation reference symbol (DM-RS); encode the CSI-RS in the first BWP at the determined CSI-RS symbol location; and encode a physical downlink control channel (PDCCH) at a symbol location in the second BWP that corresponds to the determined CSI-RS symbol location.

Example 10 includes the apparatus of the gNB of example 9, wherein the one or more processors are further configured to: puncture the CSI-RS; or puncture the symbol location in the second BWP; or allocate one or more symbols at an end of a physical downlink shared channel (PDSCH) for transmission of the CSI-RS.

Example 11 includes the apparatus of the gNB of example 1, wherein the one or more processors are further configured to: encode the CSI-RS for transmission in the first BWP with a first subcarrier spacing (SCS); and encode the CSI-RS for transmission in the second BWP with a second SCS; and drop the CSI-RS in one of the first BWP or the second BWP based on: a periodic transmission behavior of the first BWP and the second BWP; an aperiodic transmission behavior of the first BWP and the second BWP; a BWP index of the first BWP and the second BWP; a SCS of the first BWP and the second BWP; or a periodicity of the first BWP and the second BWP in a periodic transmission of the CSI-RS in the first BWP and the second BWP.

Example 12 includes the apparatus of the gNB of example 1, wherein the one or more processors are further configured to: encode a synchronization signal block (SSB) and one or more additional downlink (DL) signals in a same symbol, wherein the one or more additional DL signals comprise the CSI-RS, a physical downlink shared channel (PDSCH), or a physical downlink control channel (PDCCH); and configure the UE to skip a measurement of the SSB when the additional DL signal is the PDSCH; or configure the UE to skip the measurement of the SSB when the additional DL signal is the PDCCH; or configure the UE to skip the measurement of the SSB or the CSI-RS when the additional DL signal is the CSI-RS.

Example 13 includes an apparatus of a user equipment (UE) operable to transmit in multiple bandwidth parts (BWPs), the apparatus comprising: one or more processors configured to: determine a sounding reference signal (SRS) symbol location in a first bandwidth part (BWP); determine a SRS symbol location in a second BWP; encode the SRS in one or more of the first BWP or the second BWP for transmission to a gNB; and a memory interface configured to send to a memory the SRS symbol location.

Example 14 includes the apparatus of the UE of example 13, wherein the one or more processors are further configured to transmit a physical uplink control channel (PUCCH), the SRS, or a physical random access channel (PRACH) in multiple BWPs in a same symbol based on: a dropping rule based on a BWP index; or a dropping rule based on a type of each channel; or a dropping rule based on a content of each channel.

Example 15 includes the apparatus of the UE of example 13, wherein the one or more processors are further configured to: drop the SRS in one of the first BWP or the second BWP based on: a numerology index of the first BWP and the second BWP; a BWP index of the first BWP and the second BWP; a higher layer signal via new radio (NR) minimum system information (MSI); a higher layer signal via NR remaining minimum system information (RMSI); a higher layer signal via NR system information block (SIB); or a higher layer signal via radio resource control (RRC) signaling.

Example 16 includes the apparatus of the UE of example 13, wherein the one or more processors are further configured to: determine a collision of a first SRS symbol in a first BWP with a second SRS in a second BWP; or time domain hop the first SRS symbol in the first BWP.

Example 17 includes an apparatus of a next generation node B (gNB) operable to multiplex reference signals, the apparatus comprising: one or more processors configured to: identify a beam management channel state information reference signal (BM-CSI-RS) symbol; identify a link adaptation channel state information reference signal (LA-CSI-RS) symbol; select a symbol in a slot for multiplexing one or more of the BM-CSI-RS and the LA-CSI-RS to form a multiplexed channel state information reference symbol (CSI-RS); encode the multiplexed CSI-RS in the selected symbol for transmission to a user equipment (UE); and a memory interface configured to send to a memory the CSI-RS symbol location.

Example 18 includes the apparatus of the gNB of example 17, wherein the one or more processors are further configured to select the symbol in the slot for multiplexing the BM-CSI-RS and the LA-CSI-RS, wherein a symbol location is: before a demodulation reference symbol (DMRS) in the slot; after a DMRS in the slot; in a middle of a physical downlink shared channel (PDSCH) in the slot; or in one or more symbols at an end of the PDSCH in the slot.

Example 19 includes the apparatus of the gNB of example 17, wherein the one or more processors are further configured to drop one of the BM-CSI-RS or the LA-CSI-RS based on: a higher layer signal of the BM-CSI-RS or the LA-CSI-RS; a periodicity of the BM-CSI-RS or the LA-CSI-RS; or a predefined configuration.

Example 20 includes the apparatus of the gNB of example 17, wherein the one or more processors are further configured to determine a priority of the BM-CSI-RS or the LA-CSI-RS based on: a one bit message indicating the gNB's ability to use the BM-CSI-RS or the LA-CSI-RS; or a subcarrier spacing (SCS) of the CSI-RS, wherein the LA-CSI-RS is used if the SCS of the CSI-RS is equal to a SCS of a data channel.

Example 21 includes the apparatus of the gNB of example 17, wherein the one or more processors are further configured to: determine that the multiplexed CSI-RS has a CSI-RS type that is one of the BM-CSI-RS or the LA-CSI-RS; and encode the CSI-RS type as a higher layer parameter in a radio resource control (RRC) signal for transmission to the UE, to determine the CSI-RS type.

Example 22 includes an apparatus of a next generation node B (gNB) operable to transmit in multiple bandwidth parts (BWPs), the apparatus comprising: one or more processors configured to: determine a channel state information reference signal (CSI-RS) symbol location in a first bandwidth part (BWP); determine a CSI-RS symbol location in a second BWP; encode the CSI-RS in one or more of the first BWP or the second BWP for transmission to a user equipment (UE); and a memory interface configured to send to a memory the CSI-RS symbol location.

Example 23 includes the apparatus of the gNB of example 22, wherein the one or more processors are further configured to: decode a user equipment (UE) capability message indicating a UE's ability to use multiple BWPs to receive the CSI-RS; encode the CSI-RS in the determined CSI-RS symbol location for the one or more of the first BWP or the second BWP based on the UE capability message; decode the UE capability message to determine a number of SCSs that the UE can support at a given time; and receive the UE capability message via a higher layer signal.

Example 24 includes the apparatus of the gNB of example 22, wherein the one or more processors are further configured to decode the UE capability message to determine that the UE can support: the first BWP with a first subcarrier spacing (SCS); and the second BWP with a second SCS; or the first BWP and the second BWP with the first SCS.

Example 25 includes the apparatus of the gNB of example 22, wherein the one or more processors are further configured to: determine an SCS for each BWP in a plurality of BWPs; encode a CSI-RS for beam management (BM) for transmission in a BWP in the plurality of BWPs with a largest SCS at one or more symbols in the BWP; and puncture corresponding symbols in a physical downlink shared channel (PDSCH) of remaining BWPs in the plurality of BWPs; or rate match corresponding symbols in the PDSCH of remaining BWPs in the plurality of BWPs.

Example 26 includes the apparatus of the gNB of example 22, wherein the one or more processors are further configured to: encode a CSI-RS for beam management (BM) for transmission in a BWP in the plurality of BWPs at one or more symbols in the BWP, wherein the one or more symbols in the BWP are a last symbol of the PDSCH; and encode corresponding symbols in a physical downlink shared channel (PDSCH) of remaining BWPs in the plurality of BWPs with data.

Example 27 includes the apparatus of the gNB of example 22, wherein the one or more processors are further configured to: determine the CSI-RS symbol location in the first BWP is located prior to a demodulation reference symbol (DM-RS); encode the CSI-RS in the first BWP at the determined CSI-RS symbol location; encode a physical downlink control channel (PDCCH) at a symbol location in the second BWP that corresponds to the determined CSI-RS symbol location; and puncture the CSI-RS; or puncture the symbol location in the second BWP; or allocate one or more symbols at an end of a physical downlink shared channel (PDSCH) for transmission of the CSI-RS.

Example 28 includes the apparatus of the gNB of example 22, wherein the one or more processors are further configured to; encode the CSI-RS for transmission in the first BWP with a first subcarrier spacing (SCS); and encode the CSI-RS for transmission in the second BWP with a second SCS; and drop the CSI-RS in one of the first BWP or the second BWP based on: a periodic transmission behavior of the first BWP and the second BWP; an aperiodic transmission behavior of the first BWP and the second BWP; a BWP index of the first BWP and the second BWP; a SCS of the first BWP and the second BWP; or a periodicity of the first BWP and the second BWP in a periodic transmission of the CSI-RS in the first BWP and the second BWP.

Example 29 includes the apparatus of the gNB of example 22, wherein the one or more processors are further configured to: encode a synchronization signal block (SSB) and one or more additional downlink (DL) signals in a same symbol, wherein the one or more additional DL signals comprise the CSI-RS, a physical downlink shared channel (PDSCH), or a physical downlink control channel (PDCCH); and configure the UE to skip a measurement of the SSB when the additional DL signal is the PDSCH; or configure the UE to skip the measurement of the SSB when the additional DL signal is the PDCCH; or configure the UE to skip the measurement of the SSB or the CSI-RS when the additional DL signal is the CSI-RS.

Example 30 includes an apparatus of a user equipment (UE) operable to transmit in multiple bandwidth parts (BWPs), the apparatus comprising: one or more processors configured to: determine a sounding reference signal (SRS) symbol location in a first bandwidth part (BWP); determine a SRS symbol location in a second BWP; encode the SRS in one or more of the first BWP or the second BWP for transmission to a gNB; and a memory interface configured to send to a memory the SRS symbol location.

Example 31 includes the apparatus of the UE of example 30, wherein the one or more processors are further configured to transmit a physical uplink control channel (PUCCH), the SRS, or a physical random access channel (PRACH) in multiple BWPs in a same symbol based on: a dropping rule based on a BWP index; or a dropping rule based on a type of each channel; or a dropping rule based on a content of each channel.

Example 32 includes the apparatus of the UE of example 30, wherein the one or more processors are further configured to: drop the SRS in one of the first BWP or the second BWP based on: a numerology index of the first BWP and the second BWP; a BWP index of the first BWP and the second BWP; a higher layer signal via new radio (NR) minimum system information (MSI); a higher layer signal via NR remaining minimum system information (RMSI); a higher layer signal via NR system information block (SIB); or a higher layer signal via radio resource control (RRC) signaling.

Example 33 includes the apparatus of a next generation node B (gNB) operable to multiplex reference signals, the apparatus comprising: one or more processors configured to: identify a beam management channel state information reference signal (BM-CSI-RS) symbol; identify a link adaptation channel state information reference signal (LA-CSI-RS) symbol; select a symbol in a slot for multiplexing one or more of the BM-CSI-RS and the LA-CSI-RS to form a multiplexed channel state information reference symbol (CSI-RS); encode the multiplexed CSI-RS in the selected symbol for transmission to a user equipment (UE); and a memory interface configured to send to a memory the CSI-RS symbol location.

Example 34 includes the apparatus of the gNB of example 33, wherein the one or more processors are further configured to select the symbol in the slot for multiplexing the BM-CSI-RS and the LA-CSI-RS, wherein a symbol location is: before a demodulation reference symbol (DMRS) in the slot; after a DMRS in the slot; in a middle of a physical downlink shared channel (PDSCH) in the slot; or in one or more symbols at an end of the PDSCH in the slot.

Example 35 includes the apparatus of the gNB of example 33, wherein the one or more processors are further configured to drop one of the BM-CSI-RS or the LA-CSI-RS based on: a higher layer signal of the BM-CSI-RS or the LA-CSI-RS; a periodicity of the BM-CSI-RS or the LA-CSI-RS; or a predefined configuration.

Example 36 includes the apparatus of the gNB of example 33, wherein the one or more processors are further configured to determine a priority of the BM-CSI-RS or the LA-CSI-RS based on: a one bit message indicating the gNB's ability to use the BM-CSI-RS or the LA-CSI-RS; or a subcarrier spacing (SCS) of the CSI-RS, wherein the LA-CSI-RS is used if the SCS of the CSI-RS is equal to a SCS of a data channel.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a next generation node B (gNB) configured to transmit in multiple bandwidth parts (BWPs), the apparatus comprising:
  one or more processors configured to:
    determine a channel state information reference signal (CSI-RS) symbol location in a first bandwidth part (BWP);
    determine a CSI-RS symbol location in a second BWP;
    encode the CSI-RS in one or more of the first BWP or the second BWP for transmission to a user equipment (UE); and
    decode a signal from the UE to determine that one of:
      the UE supports a first subcarrier spacing (SCS) for the first BWP and a second SCS for the second BWP at a given time; or
      the UE supports the first SCS for both the first BWP and the second BWP at a given time; and
  a memory interface configured to send to a memory the CSI-RS symbol location.

2. The apparatus of claim 1, further comprising a transceiver configured to:
  transmit the CSI-RS in one or more of the first BWP or the second BWP to the user equipment (UE).

3. The apparatus of claim 1, wherein the signal includes a higher layer signal corresponding to
  a UE capability message.

4. The apparatus of claim 1, wherein the one or more processors are further configured to:
determine an SCS for each BWP in a plurality of BWPs;
encode a CSI-RS for beam management (BM) for transmission in a BWP in the plurality of BWPs with a largest SCS at one or more symbols in the BWP; and
puncture corresponding symbols in a physical downlink shared channel (PDSCH) of remaining BWPs in the plurality of BWPs; or
rate match corresponding symbols in the PDSCH of remaining BWPs in the plurality of BWPs.

5. The apparatus of claim 1, wherein the one or more processors are further configured to:
encode a CSI-RS for beam management (BM) for transmission in a BWP in the plurality of BWPs at one or more symbols in the BWP; and
encode corresponding symbols in a physical downlink shared channel (PDSCH) of remaining BWPs in the plurality of BWPs with data.

6. The apparatus of claim 1, wherein the one or more processors are further configured to:
determine the CSI-RS symbol location in the first BWP is located prior to a demodulation reference symbol (DM-RS);
encode the CSI-RS in the first BWP at the determined CSI-RS symbol location; and
encode a physical downlink control channel (PDCCH) at a symbol location in the second BWP that corresponds to the determined CSI-RS symbol location.

7. The apparatus of claim 1, wherein the one or more processors are further configured to:
puncture the CSI-RS; or
puncture the symbol location in the second BWP; or
allocate one or more symbols at an end of a physical downlink shared channel (PDSCH) for transmission of the CSI-RS.

8. The apparatus of claim 1, wherein the one or more processors are further configured to:
encode the CSI-RS for transmission in the first BWP with a first subcarrier spacing (SCS); and
encode the CSI-RS for transmission in the second BWP with a second SCS; and
drop the CSI-RS in one of the first BWP or the second BWP based on:
a periodic transmission behavior of the first BWP and the second BWP;
an aperiodic transmission behavior of the first BWP and the second BWP;
a BWP index of the first BWP and the second BWP;
a SCS of the first BWP and the second BWP; or
a periodicity of the first BWP and the second BWP in a periodic transmission of the CSI-RS in the first BWP and the second BWP.

9. The apparatus of claim 1, wherein the one or more processors are further configured to:
encode a synchronization signal block (SSB) and one or more additional downlink (DL) signals in a same symbol, wherein the one or more additional DL signals comprise the CSI-RS, a physical downlink shared channel (PDSCH), or a physical downlink control channel (PDCCH); and
configure the UE to skip a measurement of the SSB when the additional DL signal is the PDSCH; or
configure the UE to skip the measurement of the SSB when the additional DL signal is the PDCCH; or
configure the UE to skip the measurement of the SSB or the CSI-RS when the additional DL signal is the CSI-RS.

10. An apparatus of a user equipment (UE) configured to transmit in multiple bandwidth parts (BWPs) at a given time, the apparatus comprising:
one or more processors configured to:
determine a sounding reference signal (SRS) symbol location in a first bandwidth part (BWP);
determine a SRS symbol location in a second BWP;
encode the SRS in one or more of the first BWP or the second BWP for transmission to a gNB; and
encode for transmission to the gNB a signal to indicate that one of:
the UE supports a first subcarrier spacing (SCS) for the first BWP and a second SCS for the second BWP at a given time; or
the UE supports the first SCS for both the first BWP and the second BWP at a given time; and
a memory interface configured to send to a memory the SRS symbol location.

11. The apparatus of claim 10, further comprising a transceiver configured to:
transmit the SRS in one or more of the first BWP or the second BWP to a gNB.

12. The apparatus of claim 10, wherein the UE includes an antenna, a touch sensitive display screen, a speaker, a microphone, a graphics processor, an application processor, an internal memory, a non-volatile memory port, or combinations thereof.

13. The apparatus of claim 10, wherein the one or more processors are further configured to:
transmit a physical uplink control channel (PUCCH), the SRS, or a physical random access channel (PRACH) in multiple BWPs in a same symbol based on:
a dropping rule based on a BWP index; or
a dropping rule based on a type of each channel; or
a dropping rule based on a content of each channel.

14. The apparatus of claim 10, wherein the one or more processors are further configured to:
drop the SRS in one of the first BWP or the second BWP based on:
a numerology index of the first BWP and the second BWP;
a BWP index of the first BWP and the second BWP;
a higher layer signal via new radio (NR) minimum system information (MSI);
a higher layer signal via NR remaining minimum system information (RMSI);
a higher layer signal via NR system information block (SIB); or
a higher layer signal via radio resource control (RRC) signaling.

15. The apparatus of claim 10, wherein the one or more processors are further configured to:
determine a collision of a first SRS symbol in a first BWP with a second SRS in a second BWP; or
time domain hop the first SRS symbol in the first BWP.

16. At least one non-transitory machine readable storage medium storing instructions thereon, the instructions, when executed by one or more processors at a next generation node B (gNB), to cause the one or more processors to perform operations including:
determining a channel state information reference signal (CSI-RS) symbol location in a first bandwidth part (BWP);
determining a CSI-RS symbol location in a second BWP;

encoding the CSI-RS in one or more of the first BWP or the second BWP for transmission to a user equipment (UE); and decoding a signal from the UE to determine that one of:
the UE supports a first subcarrier spacing (SCS) for the first BWP and a second SCS for the second BWP at a given time; or
the UE supports the first SCS for both the first BWP and the second BWP at a given time.

\* \* \* \* \*